United States Patent [19]

Yamashita et al.

[11] Patent Number: 4,929,500
[45] Date of Patent: May 29, 1990

[54] CORROSION RESISTANT MAGNETIC DISK

[75] Inventors: Tsutomu T. Yamashita; Ching-Cheng Shir, both of San Jose; Tu Chen, Saratoga, all of Calif.

[73] Assignee: Komag, Inc., Milpitas, Calif.

[21] Appl. No.: 847,990

[22] Filed: Apr. 3, 1986

[51] Int. Cl.$^5$ .............................................. G11B 5/72
[52] U.S. Cl. .................................. 428/336; 204/192.1; 427/131; 428/469; 428/694; 428/695; 428/900
[58] Field of Search ............... 428/469, 694, 695, 900, 428/336; 427/131; 204/192.1

[56] References Cited

U.S. PATENT DOCUMENTS

| | | | |
|---|---|---|---|
| 3,912,461 | 10/1975 | Wakefield | 29/195 |
| 3,955,295 | 5/1976 | Mayer | 40/2.2 |
| 4,124,736 | 11/1978 | Patel et al. | 427/131 |
| 4,152,487 | 5/1979 | Yanagisawa | 428/621 |
| 4,277,540 | 7/1981 | Aine | 428/627 |
| 4,390,562 | 6/1983 | Yanagisawa | 427/131 |
| 4,411,963 | 10/1983 | Aine | 427/131 |
| 4,461,807 | 7/1984 | Mori et al. | 428/469 |
| 4,554,217 | 11/1985 | Grimm et al. | 428/695 |
| 4,579,777 | 4/1986 | Honguu et al. | 428/694 |
| 4,649,448 | 3/1987 | Nakajima . | |
| 4,820,666 | 4/1989 | Hirano et al. | 501/104 |

FOREIGN PATENT DOCUMENTS

| | | |
|---|---|---|
| 2039201 | 2/1971 | Fed. Rep. of Germany ...... 427/131 |
| 58140 | 12/1978 | Japan . |
| 60258727 | 12/1980 | Japan . |
| 56-019517 | 2/1981 | Japan . |
| 57-176537 | 10/1982 | Japan . |
| 58-019739 | 2/1983 | Japan . |
| 60-055508 | 3/1985 | Japan . |
| 60-093618 | 5/1985 | Japan . |
| 61-074103 | 4/1986 | Japan . |
| 61-115230 | 6/1986 | Japan . |
| 61-131224 | 6/1986 | Japan . |
| 61-156523 | 7/1986 | Japan . |
| 62-175949 | 8/1987 | Japan . |

OTHER PUBLICATIONS

Thin Solid Films, 94 (1982) pp. 31–45.
Weak-Beam Analysis of Accomodating Substructure on α-Alumina of a Partially Stabilized Zirconia, B.V. Narasimha Rao, Apr. 2, 1980.
"Wear Control Handbook", published by the American Society of Mechanical Engineers, 1980, pp. 385–411.
J. E. Greene, C. E. Wickersham, and J. L. Zilko entitled "Morphological and Electrical Properties of rf Sputtered $Y_2O_3$ Doped $ZrO_2$ Thin Films" J. Vac. Sci. Technol., vol. 13, No. 1, Jan./Feb. 1976, pp. 72–75.
JCPDS International Centre for Diffraction Data "1979 Powder Diffraction File–Inorganic Materials Alphabetical Index (Chemical and Mineral Name)".
E. C. Subbarao, "Zirconia–an Overview", the American Ceramic Society, Inc., Advances in Ceramics, vol. 3, Science and Technology of Zirconia, published in 1981, pp. 1–24.
J. E. Greene and R. E. Klinger entitled "Growth and Characterization of Doped $ZrO_2$ and $CeO_2$ Films Deposited by Bias Sputtering", J. Vac. Sci. Technol., vol. 14, No. 1, Jan./Feb. 1977, pp. 177–180.
J. K. Howard, "Thin Films for Magnetic Recording Technology: a Review", Journal of Vacuum Science & Tech., Jan.-Feb., 1986, vol. 4, No. 1, pp. 1–13.
Tu Chen et al., "Microstructure and Magnetic Properties of Electroless Co-P Thin Films Grown on an Aluninum Base Disk Substrate", J. Appl. Phys. 49(3), Mar. 1978, pp. 1816–1818.
Y. Suganuma et al., "Production Process and High Density Recording Characteristics of Plated Disks (Invited)", IEEE Transactions on Magnetics, Vo. MAG-18, No. 6, Nov. 1982, pp. 1215–1220.
King, Francis K. "Datapoint Thin Film Media", IEEE Transactions on Magnetics, vol. MAG-17, No. 4, Jul. 1981, pp. 1376–1379.
Hewlett-Packard Journal, Nov. 1985.
Bowden et al., "Friction–An Introduction to Tribology", (1982), pp. 91–94.

Primary Examiner—Paul J. Thibodeau
Attorney, Agent, or Firm—Skjerven, Morrill, MacPherson, Franklin & Friel

[57] ABSTRACT

A film of magnetic recording media is covered with a layer comprising $ZrO_2$. Advantageously, the $ZrO_2$ layer inhibits corrosion in the underlying magnetic recording media. The $ZrO_2$ layer also exhibits desirable mechanical properties, e.g. reduced stiction. In one embodiment of our invention, the $ZrO_2$ is sputtered onto the magnetic recording media.

15 Claims, 3 Drawing Sheets

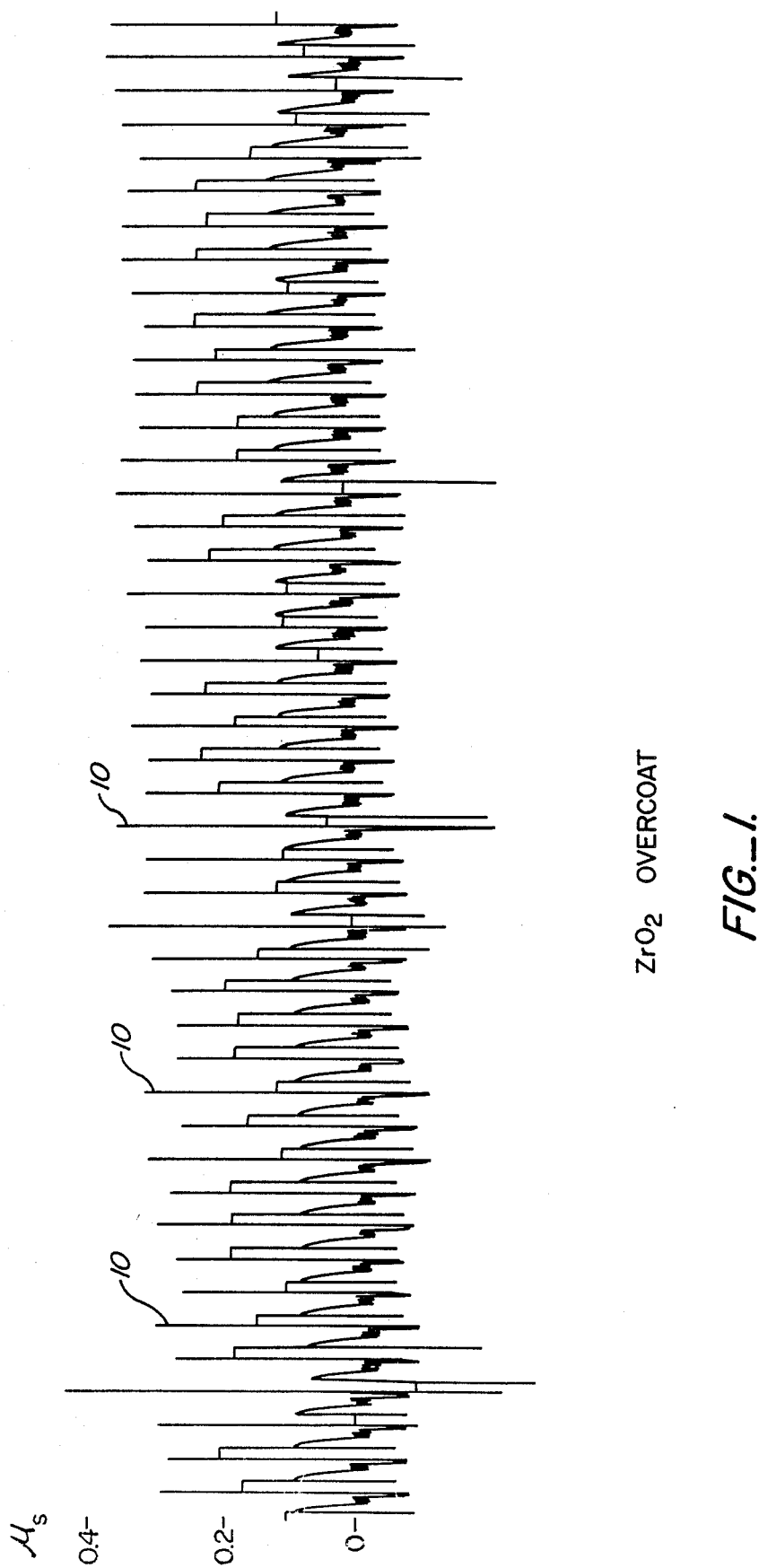
FIG._1.

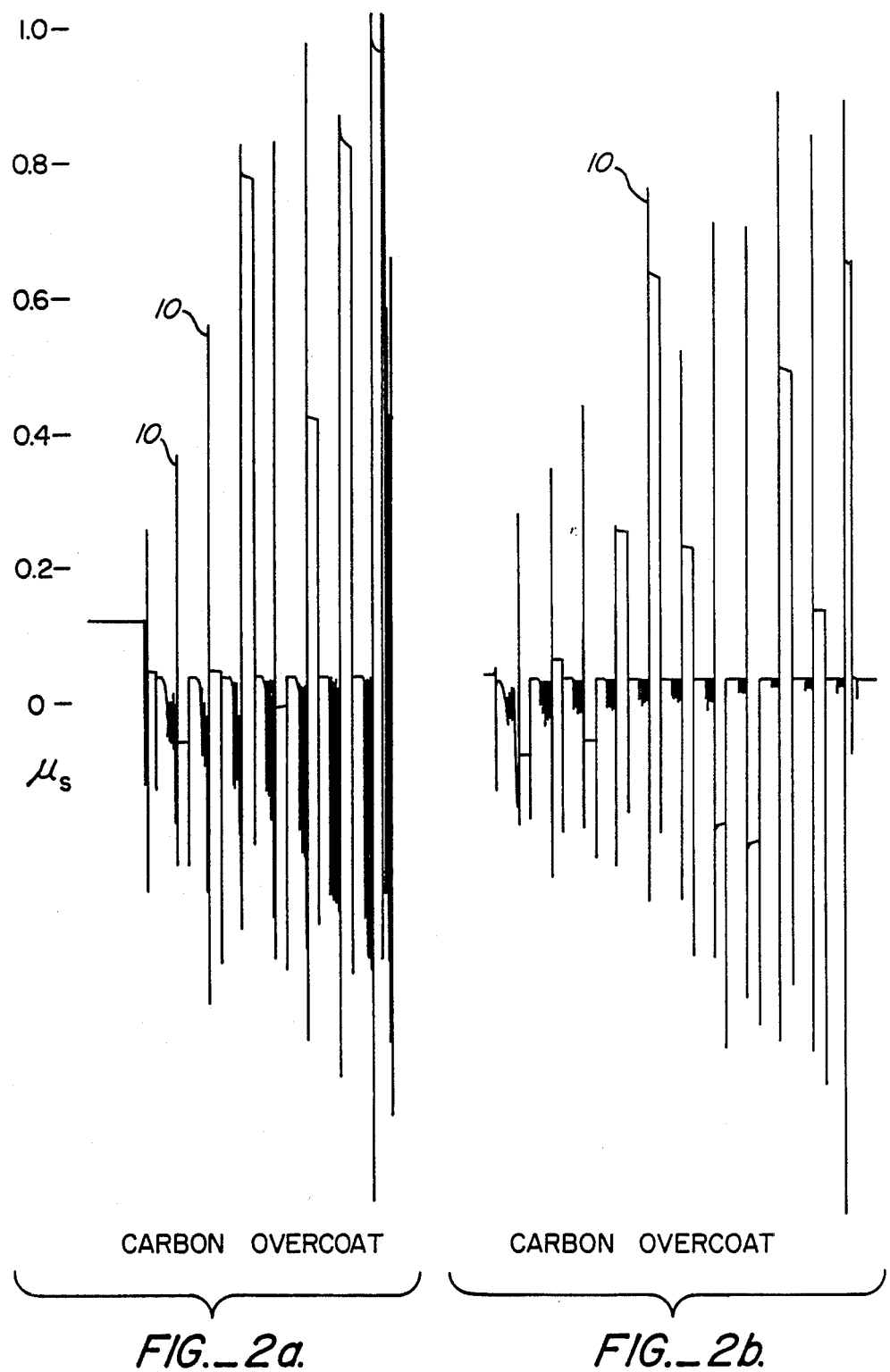
FIG._2a.    FIG._2b.

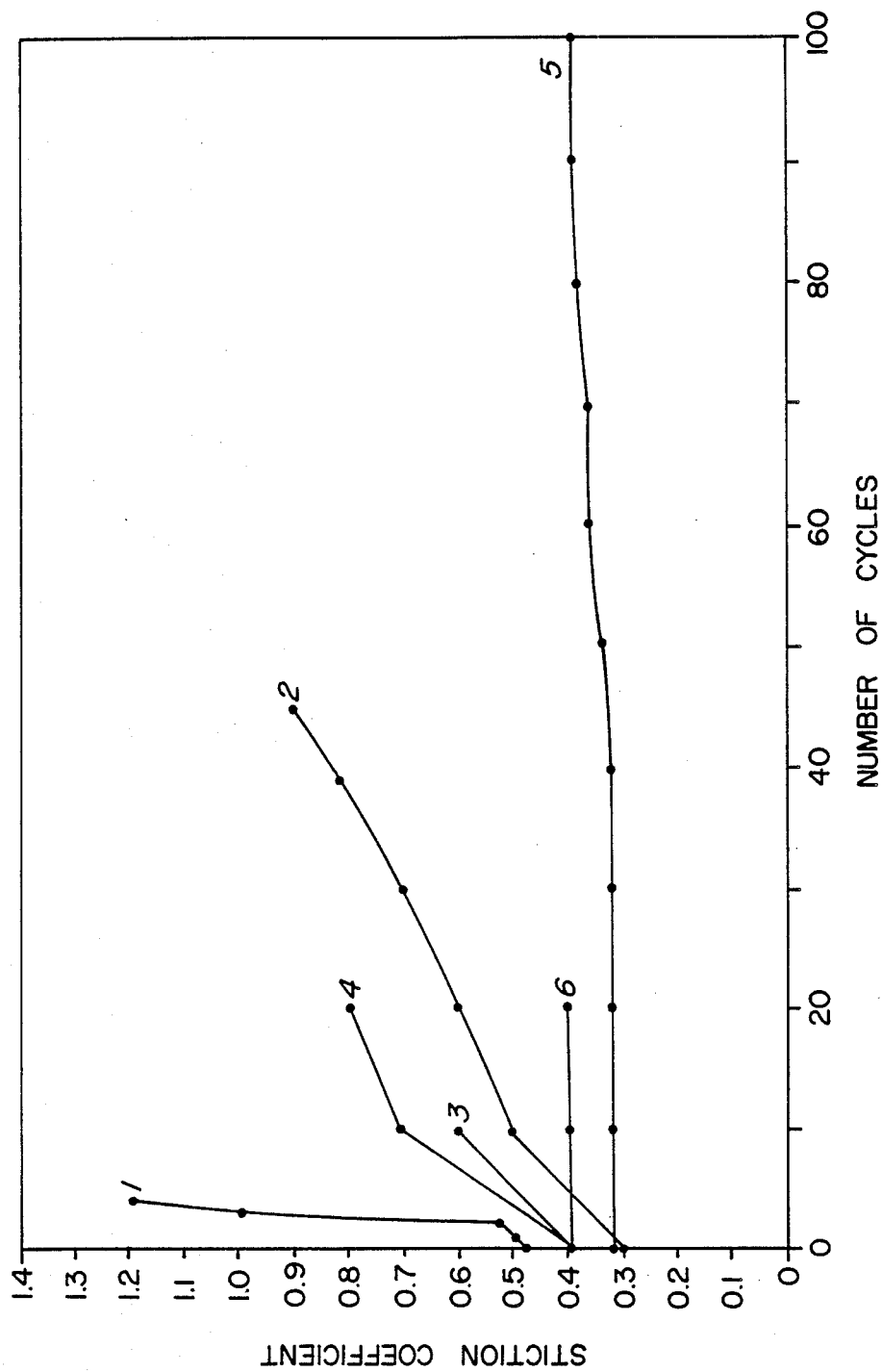
FIG._3.

CORROSION RESISTANT MAGNETIC DISK

BACKGROUND OF THE INVENTION

This invention relates to thin film magnetic recording media and more specifically to magnetic media covered with material which prevents corrosion, improves wear resistance, and reduces the head to media stiction coefficient.

Metallic magnetic thin film disks used in memory applications typically comprise a substrate material which is coated with a magnetic alloy film which serves as the recording medium. Typically, the recording medium used in such disks is a cobalt-based alloy such as Co-Ni, Co-Cr, Co-Ni-Cr, Co-Pt or Co-Ni-Pt which is deposited by vacuum sputtering as discussed by J. K. Howard in "Thin Films For Magnetic Recording Technology: A Review", published in Journal of Vacuum Science & Technology, in 1985, incorporated herein by reference, or a Co-P or Co-Ni-P film deposited by chemical plating as discussed by Tu Chen et al. in "Microstructure and Magnetic Properties of Electroless Co-P Thin Films Grown on an Aluminum Base Disk Substrate", published in the Journal Applied Physics in 1978, and Y. Suganuma et al. in "Production Process and High Density Recording Characteristics of Plated Disks", published in IEEE Transactions on Magnetics in 1982, also incorporated herein by reference. Several problems are encountered in using unprotected metallic thin film recording media. For example, unprotected metallic thin films tend to corrode, particularly under high humidity conditions. Further, such films have very little resistance to wear caused by frequent contact between the recording head and the media.

To prevent these problems, it is known in the art of recording technology that overcoating thin film magnetic recording media with a hard protective layer such as a carbon or $SiO_2$ layer improves the wear resistance of the recording media and also provides some corrosion protection to the magnetic film in a low humidity and low temperature environment. Carbon overcoatings for magnetic disks are described by F. K. King in "Datapoint Thin Film Media", published in IEEE Transactions on Magnetics in 1981, and Japanese Patent Application No. 58140/77 filed May 18, 1977 by Hinata et al., incorporated herein by reference. It is possible, in principle, to increase the corrosion protection by increasing the thickness of the carbon or $SiO_2$ overcoat. However, the maximum thickness of the overcoat that is tolerable for high performance disk media is about 2 microinches ($2\mu''$). Of importance, the performance of the disk is improved as the overcoat is made even thinner. The decrease in overcoat thickness decreases the "effective flying height" of the head on the media (i.e. the gap between the surface of the head and the magnetic layer), thereby improving the signal to noise ratio (S/N), resolution, and overwrite characteristics of the recording media. Unfortunately, if the carbon or $SiO_2$ overcoat thickness is less than $2\mu''$, the overcoat does not provide sufficient corrosion protection for the magnetic media.

To improve the corrosion protection of the magnetic media provided by carbon or $SiO_2$, it is known in the art to deposit a thin chromium layer between the magnetic thin film media and the overcoat layer. In this multi-layer overcoat structure, the chromium layer provides enhanced corrosion resistance while the carbon or $SiO_2$ overcoat provides good wear resistance. However, in order to have effective corrosion resistance as well as good wear resistance provided by the carbon-chromium or $SiO_2$-chromium multi-layer structure, the total overcoat thickness must be greater than $2\mu''$, which is not desirable for a high performance disk.

As mentioned earlier, the overcoat must not only protect the magnetic film from corrosion, but it must also protect the magnetic film from wear. A further requirement is that the stiction coefficient between the read/write head and the overcoat must remain low over a large number of stop/start cycles. (The stiction coefficient is a ratio of lateral force and the normal loading force on the head as the disk starts to rotate.) If the stiction coefficient between the head and the overcoat material is too high (greater than 1.0), a small motor used in the drive will have difficulty starting rotation of the disk from a stationary position, and if a large motor drives the disk, the motor may cause the head to break off from the head suspension. When the disk is rotating in the drive, the head "flies" at a typical distance of about 5 to $15\mu''$ above the disk. When the drive is turned off, the head comes into physical contact with the disk. Since the drive is likely to be repeatedly turned on and off during its lifetime, the overcoat must protect the magnetic film from wear, and at the same time, the stiction coefficient between the head and the overcoat must remain low after repeated start/stop cycles It has been demonstrated that even though hard carbon or $SiO_2$ overcoats resist wear well, the stiction coefficient increases dramatically after repeated start/stop cycles.

Because of the above-described mechanical and corrosion problems, it would be desirable to coat a magnetic disk with an overcoat material which would improve corrosion protection of the magnetic film without being excessively thick and at the same time have good wear resistance and a low stiction coefficient.

SUMMARY

In accordance with our invention, a layer of $ZrO_2$ (zirconium oxide) is formed on a film of magnetic recording media, preferably by sputtering, thereby enhancing resistance to corrosion and providing good wear resistance and a reduced stiction coefficient. The magnetic recording media can be a Co-Pt, Co-Ni-Cr, Co-Ni-Pt, Co-Cr, Co-Ni, Co-Cr-Pt, or other cobalt-based alloys deposited by sputtering or plating, or Co-P or Co-Ni-P deposited by a chemical plating process. In addition, the magnetic recording media can also be an iron-based alloy. We have found that a thin $ZrO_2$ layer greatly inhibits corrosion in such films and provides good wear resistance and a low stiction coefficient. In one embodiment, the sputtering target used to provide the $ZrO_2$ layer includes a stabilizer such as $Y_2O_3$, CaO, or any of a number of other stabilizers. (As is known in the art, a stabilizer enhances the mechanical strength of a sputtering target.)

BRIEF DESCRIPTION OF THE DRAWINGS

FIG. 1 illustrates the results of a stiction test performed on a disk coated with $ZrO_2$ in which the disk was repeatedly rotationally displaced from a stationary position (i.e. a start/stop cycle test).

FIGS. 2a and 2b illustrate the results of a stiction test performed on a pair of conventional carbon coated disks in which the disks were repeatedly rotationally displaced from a stationary position.

FIG. 3 illustrates the variation in the stiction coefficient as a function of the number of start/stop cycles for a number of disks.

DETAILED DESCRIPTION

A hard disk constructed in accordance with one embodiment of our invention is fabricated by plating an NiP layer onto an aluminum substrate. A film of magnetic recording media is then formed on the NiP layer. The film can be Co-Ni-Pt, Co-Ni, Co-Pt, Co-Ni-Cr, Co-Cr, Co-Cr-Pt, or any other appropriate cobalt-based alloy deposited by vacuum evaporation, sputtering, electro-plating, or electroless plating. In addition, Co-P, Co-Ni-P, or iron-based alloys can also be used. The recording media is typically about 70 nm thick or less.

A $ZrO_2$ layer is then sputtered onto the recording media, typically to a thickness between 10 and 60 nm. Advantageously, the $ZrO_2$ layer inhibits corrosion in the magnetic recording media. This is illustrated in Table 1 below which compares corrosion in $ZrO_2$ coated films with corrosion in films coated with carbon instead of $ZrO_2$. The data of Table 1 was taken by placing four disks in an environment of 90 to 95% relative humidity and 80° C. for seven days. Corrosion was evaluated by visual tests, magnetic tests and glide height tests.

Corrosion on disks can be visibly detected since corroding Co-based films turn blue from the original gold or brown color. An appearance of blue color on the disk indicates the formation of cobalt oxide or cobalt hydroxide due to corrosion.

The magnetic test includes testing for an increase in the number of defect sites on the surface of the disk after exposure to the above-described environment. An increase in the number of defect sites occurs because the magnetic media corrodes and becomes nonmagnetic, hence the recording head is not able to record data at the site of corrosion. A typical uncorroded disk contains less than 10 defects per surface. If the defect count in one of the disks of Table 1 increased from an initial defect count by more than 20, it was considered to have failed.

A film failed the glide height test if a read-write head suspended $5\mu''$ above the disk surface struck a mound of residual material from corrosion while the disk rotated. As can be seen, the films covered with $ZrO_2$ showed no sign of corrosion after five days in the above-described environment, while the films which were not covered by $ZrO_2$ became unusable due to corrosion. After seven days, both the $ZrO_2$ covered films passed the visual, magnetic and glide height tests although one of the films exhibited a slight increase in the number of defect sites on the seventh day.

As shown in Table 1, $ZrO_2$ and $ZrO_2$-chromium overcoated disks show extremely high corrosion resistance even though the total thickness of $ZrO_2$ overcoat is less than $1\mu''$ (25 nm) and $ZrO_2$-chromium overcoat is less than $2\mu''$ (50 nm). These results show that the $ZrO_2$ overcoat alone or $ZrO_2$-chromium overcoat is a superior corrosion barrier for high performance disks.

TABLE 1

| DAY | TEST | 700 Å Thick Co—Ni—Pt Alloy Covered With 250 Å Thick Carbon | 1000 Å Thick Cr Covered with 700 Å Thick Co—Ni Covered with 250 Å Thick Carbon | 700 Å Thick Co—Ni—Pt Covered with 200 Å Thick $ZrO_2$ | 700 Å Thick Co—Ni—Pt Covered with 200 Å Thick Cr Covered With 200 Å Thick $ZrO_2$ |
|---|---|---|---|---|---|
| 1 | Visual | Clear | Tiny spot | Clear | Clear |
|  | Magnetic | No change | No change | No change | No change |
|  | Glide Height | Passed | Passed | Passed | Passed |
| 2 | Visual | Blue spots | Blue spots | Clear | Clear |
|  | Magnetic | Increased/reject | Increased | No change | No change |
|  | Glide height | Failed | Failed | Passed | Passed |
| 3 | Visual | Blue spots | Blue spots | Clear | Clear |
|  | Magnetic | Rejected | Rejected | No change | No change |
|  | Glide height | Failed | Failed | Passed | Passed |
| 5 | Visual | All blue |  | Clear | Clear |
|  | Magnetic | Rejected |  | No change | No change |
|  | Glide height | Failed |  | Passed | Passed |
| 7 | Visual | All blue |  | Clear | Clear |
|  | Magnetic | Rejected |  | Slight increase | No change |
|  | Glide height | Failed |  | Passed | Passed |

As mentioned above, the $ZrO_2$ is sputtered onto the magnetic recording media. In one embodiment, the sputtering target includes a stabilizer such as $Y_2O_3$, LaO, CaO, $ThO_2$, $HfO_2$, or $Sc_2O_3$. In addition, a number of other stabilizers are also appropriate. A typical target used in accordance with our invention is 90% $ZrO_2$ and 10% stabilizer by mole. However, in another embodiment of our invention, the $ZrO_2$ sputtering target contains no stabilizer.

We have discovered that aside from being corrosion resistant, the $ZrO_2$ layer also exhibits superior mechanical qualities. FIG. 1 illustrates the results of a stiction test for a magnetic disk coated with $ZrO_2$ and a $Y_2O_3$ stabilizer while FIGS. 2a and 2b illustrate corresponding results for two magnetic disks coated with diamond-like carbon. The disks of FIGS. 2a and 2b have slightly different surface textures. The data in these figures was taken by repetitively starting and stopping the disks and measuring the lateral force exerted on the read-write head caused by stiction between the read-write head and the carbon coated and $ZrO_2$ coated disks. During these tests, the read-write head was pushed against the disk with a force of 15 grams applied in a direction perpendicular to the disk surface. The read-write head was positioned at an approximately fixed distance from the center of the disk before the disk started to rotate. As the disk started to rotate, the lateral force exerted on the head by the stiction force was measured by a transducer attached to the suspension of the head. A signal from the transducer was then recorded on the strip chart shown in FIGS. 1, 2a, and 2b. Spikes such as spikes 10 in FIGS. 1, 2a, and 2b represent one start/stop cycle. The stiction coefficient is obtained by determining stiction force exerted on the read-write head and dividing it by the normal head loading force, which in this case is 15 grams. As can be seen, the stiction force exerted on the read-write head by the carbon coated film increased over time much more rapidly than the $ZrO_2$ coated film.

Referring to FIG. 1, a stiction coefficient of less than 0.3 was consistently measured when performing repeated start/stop cycle tests on the $ZrO_2$ coated disk. In contrast, in FIGS. 2a and 2b, an initial stiction coefficient of about 0.3 was measured during the first pass of the stiction test on the carbon-coated disks, which then rapidly increased to about 1.0 by the eighth pass in FIG. 2a, and to about 0.9 by the eleventh pass in FIG. 2b. (The read-write head in FIGS. 1, 2a and 2b was displaced in both positive and negative directions. This is because of oscillatory motion of the read/write head during the start/stop tests.)

FIG. 3 illustrates the change in stiction coefficient versus the number of start/stop cycles for Co-Ni-Pt films with a conventional diamond-like carbon coating (curves 1 to 4), and Co-Ni-Pt films with a $ZrO_2$ coating (curves 5 and 6). The surface roughness texture of the disks of curves 1 to 4 were different, thus causing the stiction characteristics of these disks to differ Specifically, the surface of the NiP layer on the aluminum substrate of the disk of curve 1 (and therefore the surface of the carbon coating of the disk of curve 1) was smoother than that of the disks of curves 2 to 4 and, therefore, the disk of curve 1 exhibited greater stiction than the disks of curves 2 to 4. In addition, the surface roughness texture of the disks of curves 5 and 6, although differing slightly, had a roughness texture similar to that of the disks of curves 2 to 4.

As can be seen, the stiction coefficient for a first disk coated with $ZrO_2$ started at 0.32 and increased to 0.39 after 100 cycles (curve 5). A second disk coated with $ZrO_2$ initially exhibited a stiction coefficient of 0.39 which increased to 0.40 after 20 cycles (curve 6). In contrast, the carbon-coated disk corresponding to curve 1 initially exhibited a stiction coefficient to 0.49 which increased to a value greater than 1.4 after only 5 starts. The other films coated with carbon initially exhibited stiction coefficients of 0.30, 0.35, and 0.40, respectively, which increased to 0.90, 0.60 and 0.80, after 45, 10, and 20 cycles, respectively (curves 2, 3, and 4). Accordingly, it is seen that films coated with $ZrO_2$ exhibited stiction coefficients which remained at lower values over time than carbon-coated Co-Ni-Pt films.

The wear resistance of $ZrO_2$ overcoated disks is superior to carbon overcoated disks. We have discovered that a $ZrO_2$ overcoated disk without additional lubrication can last more than 10,000 start/stop cycles while a diamond like carbon overcoated disk without additional lubrication tends to wear out in less than 5,000 start/stop cycles. Application of lubrication increases the wear resistance of both $ZrO_2$ and carbon coated disks such that they continue to function properly after more than 50,000 start/stop cycles. (Typical lubricants used to enhance the wear resistance of magnetic disks are discussed in the above-incorporated Suganuma paper.) However, after a large number of start/stop cycles (e.g. more than 10,000 cycles), the stiction coefficient of a disk coated with $ZrO_2$ and a lubricant generally remains lower than the stiction coefficient of a disk coated with carbon and a lubricant.

While the invention has been described with respect to a specific embodiment, those skilled in the art will recognize that changes can be made in form and detail without departing from the spirit and scope of the invention. For example, instead of using an NiP plated aluminum substrate, other substrates can be used. In addition, in some embodiments of our invention, a $ZrO_2$ layer is applied to a floppy disk. A $ZrO_2$ layer in accordance with our invention can also be formed on magnetic tape or a recording drum. Accordingly, all such changes come within the invention.

We claim:

1. A hard magnetic disk for use in magnetic induction recording comprising:
   a nonmagnetic substrate;
   a magnetic film of recording media formed on said substrate; and
   a protective layer formed above said film, said protective layer comprising sputtered $ZrO_2$ and a stabilizer, said protective layer being the uppermost vacuum-deposited layer on said disk and being substantially free of other vacuum-deposited solid lubricants.

2. The structure of claim 1 wherein said protective layer is the top layer of said structure.

3. The structure of claim 1 wherein said protective layer has a thickness greater than or equal to 5 nm.

4. Structure of claim 1 wherein said protective layer has a thickness between 10 and 60 nm.

5. Structure of claim 1 further comprising an additional layer between said recording media and said protective layer, said additional layer comprising chromium.

6. Structure of claim 1 wherein said recording media is a cobalt based alloy.

7. Structure of claim 1 wherein said recording media is an iron based alloy.

8. A method for forming a hard magnetic disk for use in magnetic induction recording comprising the steps of:
   forming a magnetic film of recording media on a nonmagnetic substrate; and
   sputtering a protective layer on said recording media, said protective layer comprising $ZrO_2$ and a stabilizer, said protective layer being the uppermost vacuum-deposited layer on said hard magnetic disk and being substantially free of other vacuum-deposited solid lubricants.

9. The method of claim 8 wherein said step of forming a protective layer comprises a step of sputtering said second layer using a sputtering target, said sputtering target including a stabilizer.

10. The method of claim 8 wherein said protective layer has a thickness greater than 5 nm.

11. The method of claim 8 wherein said protective layer is between 10 and 60 nm thick.

12. Structure for use in magnetic induction recording comprising:
    a nonmagnetic substrate;
    a magnetic film of recording media formed on said substrate; and
    a protective layer formed above said film, said protective layer comprising sputtered $ZrO_2$ and a stabilizer, said protective layer being the uppermost vacuum-deposited layer on said structure, said protective layer being substantially free of other vacuum deposited solid lubricants.

13. A method for forming a magnetic recording device for use in magnetic induction recording comprising the steps of:
    forming a magnetic film of recording media on a nonmagnetic substrate; and sputtering a protective layer on said recording media, said protective layer comprising $ZrO_2$ and a stabilizer, said protective layer being the uppermost vacuum-deposited layer on said recording device, said protective layer being substantially free of other vacuum-deposited solid lubricants.

14. Structure for use in magnetic induction recording comprising:
  a nonmagnetic substrate;
  a magnetic film of recording media formed on said substrate;
  a sputtered protective layer formed above said film, said protective layer consisting essentially of $ZrO_2$ and a stabilizer, said protective layer being the uppermost vacuum-deposited layer on said structure,
  wherein said $ZrO_2$ is the material having the greatest effect on the tribological properties of said structure of any component within said sputtered protective layer.

15. A method for forming a magnetic recording device for use in magnetic induction recording comprising the steps of:
  forming a magnetic film of recording media on a nonmagnetic substrate; and
  sputtering a protective layer on said recording media, said protective layer consisting essentially of $ZrO_2$ and a stabilizer, said protective layer being the uppermost vacuum-deposited layer on said recording device,
  wherein said $ZrO_2$ is the material having the greatest effect on the tribological properties of said structure of any component within said sputtered protective layer.

* * * * *